No. 624,156. Patented May 2, 1899.
W. D. BALCOM.
COMBINED DRILL AND TAP.
(Application filed June 10, 1898.)
(No Model.)
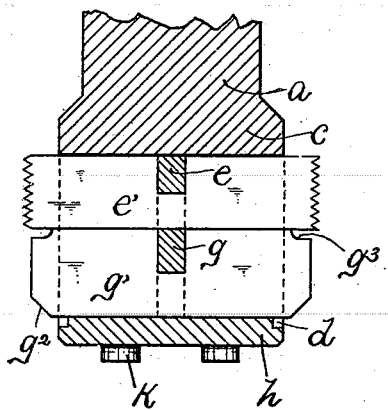
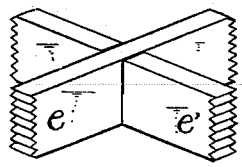
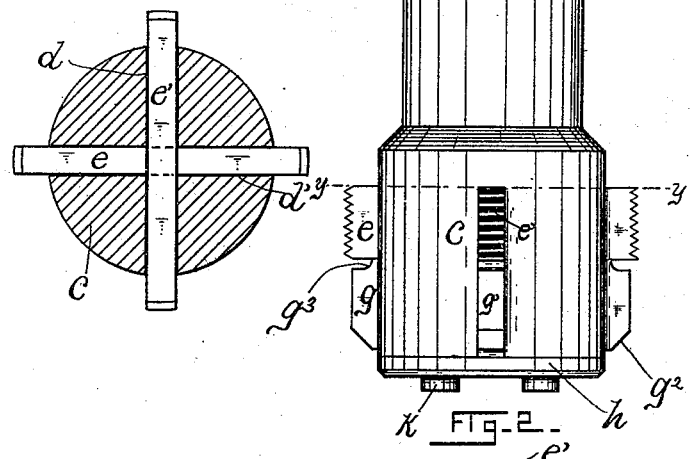
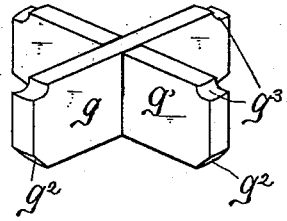
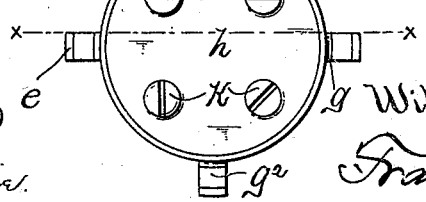
WITNESSES
INVENTOR,
William D. Balcom,
BY
Frank H. Allen,
ATTORNEY.

UNITED STATES PATENT OFFICE.

WILLIAM D. BALCOM, OF NORWICH, CONNECTICUT.

COMBINED DRILL AND TAP.

SPECIFICATION forming part of Letters Patent No. 624,156, dated May 2, 1899.

Application filed June 10, 1898. Serial No. 683,141. (No model.)

*To all whom it may concern:*

Be it known that I, WILLIAM D. BALCOM, a citizen of the United States, residing at Norwich, New London county, Connecticut, have invented certain new and useful Improvements in a Combined Drill and Tap, of which the following is a full, clear, and exact description.

This invention is in combined boring and tapping tools and seeks to provide a cheap, strong, and serviceable tool by means of which the operations of boring and tapping may be expedited and cheapened. Ordinarily in performing this class of work the hole is first bored or reamed by a tool specially adapted for that purpose and the tapping is performed by a separate tool and at a subsequent operation; but the aim of my present invention is to provide a single tool by means of which these operations of boring and tapping may be simultaneously performed.

The drawings annexed hereto illustrate my newly-invented tool.

Figure 1 is a side view of the same, and Fig. 2 an end view thereof. Fig. 3 is a central longitudinal sectional view of the head of said tool, taken on line $xx$ of Fig. 2; and Fig. 4 is a cross-sectional view of said head on line $yy$ of Fig. 1. Figs. 5 and 6 are detached perspective views of the threading-dies and boring-tools, respectively.

The letter $a$ denotes the main or body portion of my combined boring and tapping tool, and $b$ the shank of the same, said shank being adapted to enter the socket or hollow spindle of an ordinary boring-machine.

$c$ denotes the head portion of said tool, said head being formed with two transverse slots $d$ and $d'$, arranged at right angles to each other and intersecting each other at the center of the head, as is best seen in Fig. 4 of the drawings.

My cutting-dies are formed of two steel bars $e\,e'$, that are halved together centrally, as seen in Fig. 5, and are each of a length somewhat greater than the diameter of the head $c$. My cutting or boring tools are also formed of two steel bars or plates $g\,g'$, that are halved together, as seen in Fig. 6, and are of a length slightly less than the length of the threading-dies.

In assembling the parts of my newly-invented tool the threading-dies $e\,e'$ are first halved together, as in Fig. 5, and are then slipped into the slots $d\,d'$ of the head $c$, the thickness of the said dies being about equal to the width of the said slots, so that when the dies are in position in the head they are firmly held in place by the walls of the slots. After having thus placed the threading-dies in the head $c$ I next halve the cutters $g\,g'$ together, as in Fig. 6, and then slip them also into the said slots $d\,d'$, and finally secure the cutters and threading-dies in the head by a plate $h$, that is held in place by screws $k$, as explained by Figs. 1, 2, and 3. It will now be understood that the threading-dies and cutters are firmly secured within the head $c$. The outer edges of the cutters $g\,g'$—that is to say, the edges that first engage the work to be bored—are beveled, as at $g^2$, and I preferably cut away slightly those portions of said cutters that are adjacent to the threading-dies in order to provide clearance-spaces between said cutters and dies, as seen at $g^3$.

My described tool is intended for use with cored work—as, for example, in the construction of cast-iron steam-heaters—the cored holes in the castings being nearly up to size. When thus used, the cutters $g\,g'$ serve to clean the cored holes and bore them up to tapping size, and as the tool continues to feed forward the threading-dies (following the cutters) tap out the hole thus bored. It will thus be seen that at a single operation of the tool the work is not only bored, but is also tapped out, thus effecting a considerable saving of time. A further advantage in a tool of this class will readily be seen in the fact that the boring-cutters serve as guides to center the threading-dies, and thus cause the latter to do absolutely perfect work.

My described tool may be very cheaply produced, and the arrangement of the threading dies and cutters is such that they may be quickly removed from the head $c$ for grinding or to replace them with new parts whenever necessary.

Having thus described my invention, I claim—

A head provided with transverse slots, combined with the boring-cutters which are halved together, the threading-dies which are also halved together, and the plate applied to the end of the head, and which secures the cutters and dies in position; the width of said cutters and dies being just sufficient to fill the slots, substantially as shown.

Signed at Norwich, Connecticut, this 2d day of June, 1898.

WILLIAM D. BALCOM.

Witnesses:
ALONZO M. LUTHER,
FRANK H. ALLEN.